N. WATERMAN.
Egg Pan and Cake Baker.
No. 23,517. Patented April 5, 1859.
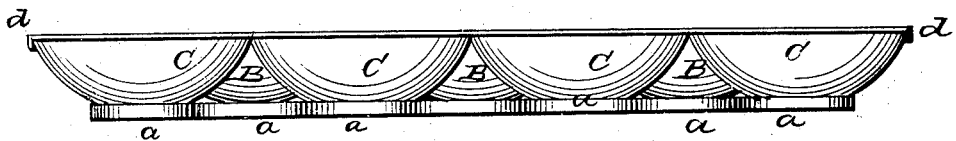
WITNESSES
Lawrence Lyons
Arthur Neill
INVENTOR
Nath Waterman

UNITED STATES PATENT OFFICE.

NATHANIEL WATERMAN, OF BOSTON, MASSACHUSETTS.

EGG-PAN.

Specification of Letters Patent No. 23,517, dated April 5, 1859.

*To all whom it may concern:*

Be it known that I, NATHANIEL WATERMAN, of Boston, in the county of Suffolk and State of Massachusetts, have invented a new or Improved Egg-Pan or Article for Cooking or Baking Eggs; and I do hereby declare that the same is fully described and represented in the following specification and the accompanying drawings, of which—

Figure 1 denotes a top view, and Fig. 2, a side elevation of the same.

The nature of my invention consists in a new or improved manufacture of egg baking pan as made with the peculiar arrangement of a series of cups and a handle at each end of such series whereby important advantages are attained.

In the drawings, A, A, A, A, B, B, B, C, C, C, C, denote eleven cups each of which is made with a flat and circular bottom $a$, which while serving to support the cup, presents a large extent of heating surface.

In the series, the four cups of each outer row are disposed respectively opposite the four cups of the other outer row, the middle row of cups being arranged between the two outer rows so that each cup of the middle row shall be in contact with or at a like distance from four cups of the two outer rows, the said arrangement of cups being particularly shown in the drawings. Where the rim of each cup is nearest to that of each adjacent cup it is joined to the same by a short connection $b$, and so as to leave open spaces $c, c, c,$ between each of the middle cups and those next contiguous to it. Furthermore, at each end of the series of cups a bar $d$ extends from the outermost cup A to the outermost cup C, and not only serves as a handle and a means of strengthening the connection of the cups, but as a conveyer of heat from one to the other, to which it immediately appertains.

The open spaces $c, c, c,$ are left between the cups in order to allow the currents of heat to pass upward between them so as to equalize the heat against their surfaces, when the baking pan is placed in an oven and the process of cooking by it is being carried on. The metallic connections of the cups at their points of contact serve as conveyers of heat from one cup to the other and thereby to disseminate the heat equally throughout the series. The handles also aid in the performance of this function.

The cups, their connections and the handles arranged as described are to be cast or founded of cast iron or other metal in one solid piece, the whole forming a new or improved cooking utensil of great value in cooking eggs or baking bread or cakes in a uniform manner and to excellent advantage in other respects.

What I claim is—

The new or improved manufacture of baking pan, or arrangement of cups and a handle at each end of the series, all connected together and cast or founded in one solid piece of metal and with heat passages between the cups substantially as hereinbefore stated.

In testimony whereof I have hereunto set my signature.

NATH. WATERMAN.

Witnesses:
R. H. EDDY,
F. P. HALE, Jr.